United States Patent [19]

Angevine et al.

[11] Patent Number: 4,683,214

[45] Date of Patent: Jul. 28, 1987

[54] NOBLE METAL-CONTAINING CATALYSTS

[75] Inventors: Philip J. Angevine, West Deptford; Stephen M. Oleck, Moorestown, both of N.J.

[73] Assignee: Mobil Oil Corporation, New York, N.Y.

[21] Appl. No.: 801,499

[22] Filed: Nov. 25, 1985

Related U.S. Application Data

[63] Continuation of Ser. No. 647,594, Sep. 6, 1984, abandoned.

[51] Int. Cl.$^4$ .............................................. B01J 29/32
[52] U.S. Cl. ...................................... 502/66; 502/64; 502/74
[58] Field of Search ............................ 502/66, 74, 64

[56] References Cited

U.S. PATENT DOCUMENTS

| | | | |
|---|---|---|---|
| 3,980,550 | 9/1976 | Gorring et al. | 502/74 X |
| 4,086,186 | 4/1978 | Rubin et al. | 502/74 X |
| 4,312,790 | 1/1982 | Butter et al. | 502/66 |
| 4,431,746 | 2/1984 | Rollman | 502/74 |

Primary Examiner—Carl F. Dees
Attorney, Agent, or Firm—A. J. McKillop; M. G. Gilman; L. P. Hobbes

[57] ABSTRACT

A process is disclosed for preparing a noble metal-containing zeolite catalyst of high noble metal dispersion. The process of crystallizing a zeolite from a forming mixture which contains an organic template, treating the zeolite by calcining or chemical oxidation to remove the template from the zeolite, mulling the zeolite with an inorganic oxide binder and a noble metal-containing solution, and thereafter extruding the blended mixture.

42 Claims, No Drawings

NOBLE METAL-CONTAINING CATALYSTS

This is a continuation of copending application Ser. No. 647,594, filed on Sept. 6, 1984 (now abandoned).

This invention relates to a novel noble metal-containing catalyst, a method of preparing same and its employment in various catalytic processes. More particularly, this invention relates to zeolite catalysts, i.e. crystalline metallosilicate catalysts, containing highly dispersed noble metal in the form of small crystallites.

Shape selective catalysis utilizing molecular sieves was first demonstrated by P. B. Weisz and V. J. Frilette in *J. Phys. Chem.* 64, p. 302 (1960). Since then, the shape selective catalytic properties of various zeolites have been extensively demonstrated. For example, N.Y. Chen and W. E. Garwood in "Some Catalytic Properties of ZSM-5, a New Shape Selective Zeolite", *Journal of Catalysis*, 52, pp. 453–458 (1978) described the shape selectivity of ZSM-5. On the other hand, the use of zeolites as shape-selective supports for catalytic functions has received much less attention.

P. B. Weisz, V. J. Frilette, R. W. Maatman and F. B. Mower in "Catalysis by Crystalline Aluminosilicates II. Molecular-Shape Reactions", *Journal of Catalysis*, 1, pp. 307–312 (1962) described a shape selective olefin hydrogenation catalyst comprising platinum incorporated in zeolite A. In U.S. Pat. No. 3,140,322 to V. J. Frilette and P. B. Weisz, a process is disclosed for hydrogenation using a platinum containing zeolite. In U.S. Pat. No. 3,226,339 of V. J. Frilette and R. W. Maatman, a process is described for the preparation of a platinum- or palladium-containing zeolite catalyst. U.S. Pat. No. 3,575,045 of J. N. Miale discloses the use of a platinum entrained zeolite A for selective hydrogenation.

A catalyst and process for selectively hydrogenating ethylene in the presence of propylene utilizing a zeolite in conjunction with a hydrogenation metal is disclosed in U.S. Pat. No. 3,496,246. N.Y. Chen and P. B. Weisz in "Molecular Engineering of Shape-Selective Catalysts", *Kinetics and Catalysis, Chem. Eng. Prog. Symp.* Serial No. 73, Vol. 63, 1967, p. 86, described a platinum catalyzed hydrogenation employing a phosphine-poisoned, platinum-exchanged sodium mordenite zeolite.

An excellent summary of the art of metal loaded zeolite catalysts and shape selective catalysis is given in *Zeolite Chemistry and Catalysts*, J. A. Rabo, ed., ACS Monograph 171 (1976). Of particular interest is Chapter 10, "Catalytic Properties of Metal-Containing Zeolites" by K. M. Minachev and Y. I. Isakov and Chapter 12, "Shape-Selective Catalysis" by S. M. Csicsery.

Catalysts such as ZSM-5 combined with a Group VIII metal are described in U.S. Pat. No. 3,856,872 to Morrison. It is disclosed in this patent that the catalysts be preferably incorporated in a porous matrix such as alumina. A Group VIII (hydrogenation) metal may then be added after incorporation with the zeolite in a matrix by such means as base exchange or impregnation. In one embodiment, the metal is added in the form of chloroplatinic acid.

U.S. Pat. No. 4,188,282 discloses particularly preferred forms of noble metal-containing zeolites such as ZSM-5 formed by the crystallization of the zeolite from a forming solution containing noble metal ions, such as those of platinum.

The introduction of noble metals by ion exchange methods such as those described in U.S. Pat. No. 3,856,872 can result in serious losses of the noble metal being exchanged because of the excess amounts of noble metal-containing solution required. The co-crystallization method of U.S. Pat. No. 4,188,282 not only results in significant losses of noble metals, but requires extensive modifications to the zeolite production process.

U.S. Pat. No. 4,312,790 to Butter et al. discloses a method of preparing a noble metal-containing catalyst by incorporating a noble metal in a cationic form with a zeolite after crystallization of said zeolite, but prior to the final catalyst particle formation. The zeolite is calcined only after extrusion, i.e., after addition of the noble metal. Such catalysts have been found to be an improvement over those catalysts wherein the metal is incorporated during zeolite crystallization, or after extrusion. However, attempts to commercially prepare catalysts by the muller method have resulted in catalysts of poor platinum dispersion and large platinum crystallites.

Accordingly, it would be desirable to commercially produce zeolite catalysts which contain relatively small platinum crystallites and exhibit high platinum dispersion. For the purposes of the present invention, the dispersion of a metal $D_m$, is defined as the ratio of the number of surface atoms to the total number of metal atoms.

SUMMARY OF THE INVENTION

In accordance with the present invention, there is now provided a novel noble metal-containing zeolite catalyst and method to prepare the same. The catalyst is prepared by crystallizing a zeolite from a forming mixture which contains an organic template and subsequently treating the zeolite to remove the template from the zeolite interior. After removal of the template from the zeolite, the zeolite can be blended with a binder, for example, an inorganic oxide such as alumina, and a solution containing noble metal. The blended mixture can then be extruded to form the desired type of catalyst particle.

The organic template may be removed from the porous crystalline metallosilicate either by calcining, steaming, or chemical treatment such as chemical oxidation or combinations of the above. A discussion of the thermal decomposition of zeolite precursors such as tetrapropylammonium-ZSM-5 can be found at ZEOLITES, 1984, Vol. 4, April; Parker, L. M., Bibby, D. M., and Patterson, J. F.

Catalysts produced by the methods of the present invention are particularly useful in any process or combination of processes which employs metal catalyst components such as platinum or palladium, as well as other noble metals. Examples of such processes include hydrogenation, dehydrogenation, dehydrocyclization, isomerization, hydrocracking, dewaxing, reforming, conversion of alkyl aromatics, oxidation, etc. The catalysts of the present invention have been found to be particularly useful in catalytic dewaxing of distillate fuel oils and gas oils wherein waxy components are isomerized by contact with a zeolite beta catalyst, according to the process disclosed in U.S. Pat. No. 4,419,220 to LaPierre et al., incorporated herein by reference.

The noble metal-containing catalysts of the present invention comprise a member or members of the novel class of zeolites as defined herein, a noble metal and a binder. In practicing the method of the present invention, the noble metal-containing zeolite catalyst is prepared by crystallizing a zeolite from a forming mixture containing an organic template, treating the zeolite to remove the organic template from the zeolite, and thereafter blending the zeolite from which the organic template has been removed, with the binder and a noble metal-containing solution. The latter two components may be blended with said zeolite either in combination or separately. After blending, the mixture is extruded into the desired catalyst particle form. It has been found that noble metal-containing zeolites to which the noble metal has been added exhibit enhanced platinum dispersion where the zeolite component of a mulling mixture has been treated to remove any, most, or substantially all organic template materials therein. The presence of bulky organic template materials within zeolites makes addition of noble metals via ion exchange in the mulling step difficult. Calcining the zeolite in inert gases or steam atmosphere, combusting or chemically oxidizing the organic template material can result in breaking up the organic template within a zeolite pore which thus facilitates removal of the template from within the zeolite. A noble metal-containing solution which is contacted with a zeolite whose intrazeolitic structure is substantially free of impurities, such as organic templates, will be more readily and evenly distributed throughout the zeolite interior. Noble metal can be intimately mixed with the zeolite by addition to a mulling mixture comprising zeolite and binder.

Noble metals which are incorporated within the zeolite by the present invention include ruthenium, rhodium, palladium, silver, osmium, iridium, platinum, and gold. In addition, any suitable hydrogenation component, e.g., a Group VIII metal, may be incorporated within a zeolite by the present invention. Platinum is a particularly preferred metal for purposes of the present invention. Suitable platinum compounds which may be incorporated into the mulling mixture include various cationic platinum compounds such as platinous chloride and various compounds containing platinum amine or tetrammine complexes. The amount of noble metal to the amount of total catalyst, i.e., zeolite and binder, can range from between about 0.005 weight percent and about 2.0 weight percent, and preferably from between about 0.05 weight percent and about 1.2 weight percent.

The present invention also relates to a process for conversion of a feedstock comprising organic compounds by contacting the feedstock under conversion conditions with the novel catalysts described hereinbefore. Organic compounds in such feedstocks may include alkenes, dienes, polyenes, alkynes, cyclenes, aromatic hydrocarbon compounds, alkylaromatic hydrocarbon compounds or paraffins.

For the purpose of this invention, the term "zeolite" is meant to represent the class of porotectosilicates, i.e., porous crystalline silicates that usually contain silicon and oxygen atoms as the major components. Other components may be present in minor amounts, usually less than 14 mole % and preferably less than 4 mole %. These components include aluminum, gallium, iron, boron, phosphorus and the like with aluminum being preferred and used herein for illustration purposes. The minor components may be present separately or in mixtures.

The silica to alumina mole ratio referred to may be determined by conventional analysis. This ratio is meant to represent, as closely as possible, the ratio in the rigid anionic framework of the zeolite crystal and to exclude aluminum in the binder or in cationic or other forms within the channels. Although zeolite with a silica to alumina mole ratio of at least 4 are useful, it is preferred in some instances to use zeolites having much higher silica to alumina mole ratios. Thus zeolites useful in the present invention can have silica to alumina molar ratios of at least about 20, 25, 70, or in some instances at least 100 or even at least 200.

A particular class of zeolites useful herein have an effective pore size such as to freely sorb normal hexane. In addition, the structure must provide constrained access to larger molecules. It is sometimes possible to judge from a known crystal structure whether such constrained access exists. For example, if the only pore windows in a crystal are formed by 8-membered rings of silicon and aluminum atoms, then access by molecules of larger cross section than normal hexane is excluded and the zeolite is not of the desired type. Windows of 10-membered rings are preferred, although in some instances excessive puckering of the rings or pore blockage may render these zeolites ineffective.

Although 12-membered rings in theory would not offer sufficient constraint to produce advantageous conversions, it is noted that the puckered 12-ring structure of TMA offretite does show some constrained access. Other 12-ring structures may exist which may be operative for other reasons, and therefore, it is not the present intention to entirely judge the usefulness of a particular zeolite solely from theoretical structural considerations.

Rather than attempt to judge from crystal structure whether or not a zeolite possesses the necessary constrained access to molecules of larger cross section than normal paraffins, a simple determination of the "Constraint Index" as herein defined may be made by passing continuously a mixture of an equal weight of normal hexane and 3-methylpentane over a sample of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 540° C. (1005° F.) for at least 15 minutes. The zeolite is then flushed with helium and the temperature is adjusted between 290° C. (555° F.) and 510° C. (950° F.) to give an overall conversion of between 10% and 60%. The mixture of hydrocarbons is passed at 1 liquid hourly space velocity (i.e. 1 volume of liquid hydrocarbon per volume of zeolite per hour) over the the zeolite with a helium dilution to give a helium to (total) hydrocarbon mole ratio of 4:1. After 20 minutes on stream, a sample of the effluent is taken and analyzed, most conveniently by gas chromatography, to determine the fraction remaining unchanged for each of the two hydrocarbons.

While the above experimental procedure will enable one to achieve the desired overall conversion of 10% to 60% for most zeolite samples and represents preferred conditions, it may occasionally be necessary to use somewhat more severe conditions for samples of very low activity, such as those having an exceptionally high silica to alumina mole ratio. In those instances, a temperature of up to about 540° C. (1005° F.) and a liquid hourly space velocity (LHSV) of less than one, such as 0.1 or less, can be employed in order to achieve a minimum total conversion of about 10%.

There also may be instances where the activity is so low (i.e., silica to alumina mole ratio approaching infinity) that the Constraint Index cannot be adequately measured, if at all. In such situations, Constraint Index is meant to mean the Constraint Index of the exact same substance (i.e. same crystal structure as determined by such means as X-ray diffraction pattern) but in a measureable form (i.e. aluminum containing form).

The "Constraint Index" is calculated as follows:

$$\text{Constraint Index} = \frac{\log 10(\text{fraction of hexane remaining})}{\log 10(\text{fraction of 3-methylpentane remaining})}$$

The Constraint Index approximates the ratio of the cracking rate constants for the two hydrocarbons. Zeolites suitable for the present invention are those having a Constraint Index in the appropriate range of 0.1 to 12.

Constraint Index (CI) values for some typical materials are:

|  | C.I. |
| --- | --- |
| ZSM-4 | 0.5 |
| ZSM-5 | 8.3 |
| ZSM-11 | 8.7 |
| ZSM-12 | 2 |
| ZSM-23 | 9.1 |
| ZSM-35 | 4.5 |
| ZSM-38 | 2 |
| TMA Offretite | 3.7 |
| Clinoptilolite | 3.4 |
| H—Zeolon (mordenite) | 0.4 |
| REY | 0.4 |
| Amorphous Silica-Alumina | 0.6 |
| Erionite | 38 |

The above-described Constraint Index is an important definition of those zeolites which are useful in the invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operation (conversion) and the presence or absence of binders. Likewise, other variables such as crystal size of the zeolite, the presence of occluded contaminants, etc., may affect the Constraint Index. Therefore, it will be appreciated that it may be possible to so select test conditions as to establish more than one value in the approximate range of 0.1 to 12 for the Constraint Index of a particular zeolite. Such a zeolite exhibits the constrained access as herein defined and is to be regarded as having a Constraint Index in the approximate range of 0.1 to 12. Also contemplated herein as having a Constraint Index in the approximate range of 0.1 to 12 therefore within the scope of the defined novel class of highly siliceous zeolites are those zeolites which, when tested under two or more sets of conditions within the above-specified ranges of temperature and conversion, produce a value of the Constraint Index slightly less than 0.1, e.g. 0.08, or somewhat greater than 12, e.g. 14 or 15, with at least one other value within the range of 0.1 to 12. Thus, it should be understood that the Constraint Index value as used herein is an inclusive rather than an exclusive value. That is, a crystalline zeolite when identified by any combination of conditions within the testing definition set forth herein as having a Constraint Index in the approximate range of 0.1 to 12 is intended to be included in the instant zeolite definition whether or not the same identical zeolite, when tested under other of the defined conditions, may give a Constraint Index value outside of the approximate range of 1 to 12.

The particular class of zeolites defined herein is exemplified by zeolite beta, ZSM-5, ZSM-10, ZSM-11, ZSM-5/ZSM-11 intermediate, ZSM-12, ZSM-23, ZSM-35, ZSM-38, ZSM-48, and other similar materials.

Zeolite beta is described in U.S. Pat. No. 3,308,069.

ZSM-5 is described in U.S. Pat. No. 3,702,886 and Re. No. 29,949. Such descriptions include the X-ray diffraction pattern of the therein disclosed ZSM-5.

ZSM-10 is described in U.S. Pat. No. 3,692,470 which includes the specification of the X-ray diffraction pattern of the disclosed zeolite.

ZSM-11 is described in U.S. Pat. No. 3,709,979. That description also includes the particular X-ray diffraction pattern of said ZSM-11.

ZSM-5/ZSM-11 intermediate is described in U.S. Pat. No. 4,229,424.

ZSM-12 is described in U.S. Pat. No. 3,832,449. That description also includes the particular X-ray diffraction pattern of said ZSM-12.

ZSM-23 is described in U.S. Pat. No. 4,076,842 which includes the specification of the X-ray diffraction pattern of the disclosed zeolite.

ZSM-35 is described in U.S. Pat. No. 4,016,245 which includes the X-ray diffraction pattern thereof.

ZSM-38 is described in U.S. Pat. No. 4,046,859 which includes the X-ray diffraction pattern of said ZSM-38.

ZSM-48 is described in U.S. Pat. No. 4,234,231 which includes the X-ray diffraction pattern of said ZSM-48. All of the eleven above patents are incorporated herein by reference.

It is to be understood that by citing the foregoing patents as describing examples of specific members of the zeolite class with greater particularity, it is intended that identification of the therein disclosed crystalline zeolites be resolved on the basis of their respective X-ray diffraction patterns. As discussed above, the present invention contemplates utilization of such catalyts wherein the mole ratio of silica to alumina is essentially unbounded. The citation of the identified patents should therefore not be construed as limiting the disclosed crystalline zeolites to those having the specific silica-alumina mole ratios discussed therein, it now being known that such zeolites may contain very low amounts of aluminum and yet, having the same crystal structure as the disclosed materials, may be useful or even preferred in some applications. It is the crystal structure, as identified by the X-ray diffraction "fingerprint", which establishes the identity of the specific crystalline zeolite material.

The preferred crystalline zeolites for utilization herein include ZSM-5, ZSM-10, ZSM-11, ZSM-12, ZSM-18, ZSM-20, ZSM-23, ZSM-35, ZSM-38, ZSM-48, and zeolite beta with ZSM-5, ZSM-11, and zeolite beta being particularly preferred.

Other zeolites suitable for use in the present invention include large pore zeolites such as ZSM-18 and ZSM-20.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

As is the case of many catalysts, it is desired to incorporate the zeolite with another material resistant to the temperatures and other conditions employed in organic conversion processes. Such materials include active and inactive materials as well as inorganic materials such as clays, silica and/or metal oxides. Inactive materials suitably serve as diluents to control the amount of conversion in a given process so that products can be obtained economically without employing other means for controlling rate of reaction. Binders useful for compositing with the useful zeolite herein also include inorganic oxides, notably alumina, which is particularly preferred.

In addition to the foregoing material, the zeolite catalyst can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The relative proportions of finely divided crystalline zeolite and inorganic oxide matrix may vary widely with the zeolite content ranging from about 1 to about 90 percent by weight, and more usually in the range of about 10 to about 50 percent by weight of the composite.

A preferred procedure for preparing a typical noble metal containing zeolite catalyst composited with an inorganic oxide binder according to the present invention would comprise the following steps:

(1) preparing the zeolite from a forming mixture which contains an organic template;

(2) treating said zeolite to remove the organic template from the zeolite;

(3) mulling the zeolite with a suitable inorganic oxide binder and water to form an extrudable mass;

(4) adding to the extrudable mass of zeolite and inorganic oxide binder a noble metal-containing solution; and (5) extruding the blended mixture to form the desired catalyst particles.

The resulting catalyst particles may thereafter be activated by any suitable means, e.g., presulfiding.

Zeolites containing alkali metal, e.g. sodium are preferably treated by water washing and/or contact with ammonium nitrate in order to reduce alkali metal content either before or after treating the zeolite to remove the organic template. Preferably, the alkali metal content is reduced before said removal treatment.

Organic templates suitable for use in the zeolite forming mixture include ethylenediamine, n-propylamine, DABCO (diazoniabicyclooctane), hexanediamine, tetrabutylphosphonium, pyrrolidine, choline chloride and organic quaternary ammonium cations. Organic quaternary ammonium cations such as benzyltrimethylammonium, tetramethylammonium, methyltriethylammonium, diethyldimethylammonium, tetraethylammonium, tetrapropylammonium and tetrabutylammonium are particularly preferred. Triquaternary or diquaternary ammonium cations can also be used. Other organic templates can also be used in this invention.

Methods of treating the zeolite in order to remove the template from the zeolite include combustion or thermal decomposition of the template by calcining the zeolite and/or chemical decomposition of the zeolite, e.g., by exposure to an oxidant. It is preferred that substantial amounts or all of the template be removed from the zeolite in order to permit better incorporation of the noble metal within the zeolite. Generally, at least about 50% or even at least about 75%, 95% or 99% by weight of the organic template should be removed by calcining and/or chemical oxidation. Calcining conditions suitable for use in the present invention include temperatures ranging from about 482° to 816° C. (900° to 1500° F.) with temperatures ranging from about 510° to 649° C. (950° to 1200° F.) particularly preferred. Calcining may take place in the presence of an inert atmosphere such as nitrogen or an oxidizing atmosphere such as oxygen or air for a period of time ranging from about 1 to 9 hours. Preferably, the atmosphere is carefully controlled in order to avoid runaway combustion of any carbon remaining on the zeolite after decomposition of the organic template. Such carbon is preferably removed from the zeolite by subsequent calcining in air. Preferably, the calcining step comprises heating the zeolite in a nitrogen atmosphere for about 3 hours, followed by heating in an oxidizing atmosphere, such as air, for about 3 hours. The atmosphere may also contain steam which serves to temper or reduce the activity of the resulting zeolite.

Although the zeolite may be preferably calcined in a controlled oxygen atmosphere, other ways of calcining zeolite include treating powdered zeolite in a continuous rotary calciner or a fluid bed.

Chemical decomposition methods suitable for use in the present invention include exposure to an aqueous 10% solution of sodium hypochlorite having a pH of about 12. Other suitable oxidants include oxygen, ozone, chlorine, iodine, iodiform, nitric acid, potassium permanganate, potassium dichromate, manganese dioxide and hydrogen peroxide.

The noble metal component can be physically and intimately mixed with the zeolite in the form of either cationic or anionic noble metal species or their salts. In the case of the preferred metal platinum, suitable cationic compounds include platinous chloride and various compounds containing platinum amine or ammine complexes.

A wide variety of metallic compounds can be employed with facility as a source of metallic cations and include both inorganic and organic salts of the noble metals. Representative of the salts which can be employed are chlorides, bromides, iodides, carbonates, bicarbonates, sulfates, sulfites, sulfides, chlorates, perchlorates, thionates, thiocyanates, dithiocarbamates, peroxysulfates, acetates, benzoates, citrates, fluorides, nitrates, nitrites, formates, propionates, butyrates, valerates, lactates, malonates, oxalates, palmitates, hydroxides, tartarates and the like. The only limitation is that the salt be sufficiently soluble in the fluid medium to give the necessary ion transfer.

The present invention is particularly useful in that it affords the use of anionic species of noble metals as a means of adding noble metal to a mulling mixture comprising a zeolite and an inorganic oxide binder. Incorporation of a noble metal species by contacting noble metal-containing anions with a zeolite combined with an inorganic oxide binder is unexpected. First of all, exchange of an anionic noble metal species for a cationic species such as the sodium ions present in a zeolite as-made, appears highly unlikely. Furthermore, contacting a mixture of zeolite and inorganic oxide binder such as alumina with an anionic noble metal-containing species would be expected to result in noble metal loading of the binder rather than the zeolite owing to exchange of the platinum anion with residual hydroxyl anions of the binder. The addition of an anionic species of noble metal to a zeolite combined with an inorganic oxide such as alumina to form a catalyst having enhanced dispersion of the noble metal and reduced noble metal crystallite size is even more unexpected. Anionic noble metal-containing species particularly suitable for use in the present invention include chloroplatinic acid, chloropalladic acid, hydroxyplatinic acid, and bromoplatinic acid (platinum bromic acid). Chloroplatinic acid is particularly preferred.

Conventional methods for adding noble metal to the zeolite materials used in the present invention, e.g., excess solution ion exchange methods, do not permit very good control of metal loading. Furthermore, methods such as co-crystallization of the noble metal during zeolite formation may require significant modification of zeolite manufacturing facilities. However, the addition of noble metals during mulling of the zeolite with the inorganic oxide binder is achieved with no substantial modification of conventional process equipment. By the present invention, zeolitic catalysts of high noble metal dispersion and reduced noble metal crystallites size can be readily prepared.

Good noble metal dispersion (i.e, small crystallite size, less than about 30 or even 20 Angstroms) is an important property for satisfactory performance of noble metal-containing zeolite catalyst material. The present invention is suitable for preparing noble metal-containing catalysts having noble metal dispersion, Dm greater than about 0.2, preferably greater than about 0.25, more preferably greater than about 0.5.

It is noted that a particular advantage of the novel catalyst prepared by the method of this invention is its ability to catalyze specific reactions shape-selectively. For example, by utilizing a platinum or palladium version of the catalyst of the instant invention, straight-chain olefins will be selectively hydrogenated over branched olefins. The resultant catalyst also exhibits very good stability in the presence of poisons, e.g., sulfur and phosphorus, as well as having enhanced high temperature activity. It is also postulated that the catalyst produced by the novel method of this invention would be less susceptible to coking. Thus, the resultant catalyst would also be applicable in metal catalyzed reactions in which shape-selectivity is not per se crucial, e.g., oxidation, reforming, synthesis gas conversion, hydroformylation, dimerization, polymerization, alcohol conversion, etc.

Catalytic conversion conditions for hydrogenation of such feedstocks as alkenes, dienes, polyenes, alkynes, cyclenes, aromatics, oxygenates, etc. include a temperature of between about −20° C. (−4° F.) and about 540° C. (1005° F.), preferably between about 25° C. (77° F.) and 310° C. (590° F.), a pressure of between about 100 kPa (15 psia) and about 7800 kPa (1015 psia), preferably between about 100 kPa (15 psia) and 1480 kPa (215 psia), a hydrogen/feed mole ratio of between about 0.1 and 20, preferably between about 4 and 12 and a LHSV of between about 0.1 and 20, preferably between about 0.5 and 4.

Dehydrogenation conditions, for processes such as conversion of paraffins to the corresponding olefins, or ethyl benzene to styrene, optionally in the presence of steam or inert gases such as nitrogen, include temperatures of from about 200° C. (392° F.) to 1000° C. (1832° F.), preferably from about 350° C. (662° F.) to 600° C. (1112° F.); feedstock partial pressures of from about 10 kPa (1.5 psia) to 10,000 kPa (1470 psia), preferably from about 10 kPa (1.5 psia) to 100 kPa (14.7 psia) and a LHSV of from about 0.1 to 100, preferably between about 0.5 and 4.

Dehydrocyclization conditions, for example for conversion of paraffins to aromatics (e.g. octane to ethylbenzene or xylene), include temperatures of from about 200° C. (392° F.) to 1000° C. (1832° F.), preferably from about 350° C. (662° F.) to 600° C. (1112° F.); feedstock partial pressures of from about 10 kPa (1.5 psia) to 10,000 kPa (1470 psia), preferably from about 10 kPa (1.5 psia) to 100 kPa (14.7 psia) and a LHSV of from about 0.1 to 100, preferably between about 0.5 and 4.

Isomerization, with or without hydrogen, such as isomerization of normal paraffins, is conducted at a temperature of between about 100° C. (212° F.) and 500° C. (932° F.), preferably between about 200° C. (392° F.) and 460° C. (858° F.), a LHSV of between about 0.01 and 20, preferably between about 0.25 and 5 and a hydrogen to hydrocarbon mole ratio of between 0 and 5:1.

Catalytic conversion conditions for cracking, with or without hydrogen, include a temperature of between about 200° C. (392° F.) and about 500° C. (932° F.), a pressure of between about 170 kPa (25 psia) and about 17,600 kPa (2515 psia), a hydrogen/feed mole ratio of between about 0 and about 80 and a LHSV of between about 0.1 and about 10.

The shape selective catalysts of the present invention are also useful in dewaxing operations and can likewise be employed as reforming catalysts or as part of a reforming catalyst. Dewaxing and reforming can be carried out in the presence or absence of hydrogen under conditions which include a temperature of from about 250° C. (482° F.) to 600° C. (1112° F.), preferably from about 400° C. (752° F.) to 500° C. (932° F.); a pressure of from about 10 kPa (1.5 psia) to 10,000 kPa (1470 psia) and a WHSV of from about 0.01 to about 100, preferably from about 0.1 to 10.

The catalysts of the present invention are particularly suited to catalytic dewaxing such as the isomerization dewaxing process disclosed in U.S. Pat. No. 4,419,220. In this process a hydrocarbon feedstock such as distillate fuel oil is dewaxed by contact with a catalyst comprising zeolite beta having a silica to alumina ratio of at least 20 and a hydrogenation component such as platinum, under isomerization conditions. Isomerization may include temperatures of 200° to 540° C. (392° to 1005° F.), preferably 400° to 450° C. (752° to 842° F.), pressures from atmospheric to 25,000 kPa, preferably 4,000 to 10,000 kPa, and a space velocity (LHSV) from 0.1 to 20, preferably from 0.2 to 5. Catalytic conversion conditions for conversion of alkylaromatics such as dealkylation or hydroisomerization, particularly xylene isomerization and hydroisomerization of ethylbenzene to xylene, include a temperature of between about 260° C. (500° F.) and about 600° C. (1112° F.), preferably between about 320° C. (608° F.) and 500° C. (932° F.), a pressure of between about 240 kPa (35 psia) and about 7000 kPa (1015 psia), preferably between about 275 kPa (40 psia) and about 2860 kPa (415 psia), a hydrogen/feed mole ratio of between about 1 and 20, preferably between about 2 and about 8 and a WHSV of between about 1 and 50, preferably between about 5 and about 15.

The metal-containing catalysts of the present invention can also be advantageously employed under oxidation reaction conditions as oxidation or combustion catalysts. Thus, the novel catalysts of the present invention can be employed for oxidation reactions such as oxidation or combustion of paraffins, olefins and alkylaromatics and in processes involving reaction of CO and H$_2$ (methanol synthesis, Fischer-Tropsch process, etc.) wherein shape selectivity is not necessarily essential. Such catalysts can also shape selectively catalyze oxidation reactions such as, for example, the selective oxidation of p-xylene relative to o-xylene.

The following examples will serve to illustrate the invention without limiting the same. Examples 1 to 5 illustrate conventional methods used to prepare the catalyst and improve noble metal dispersion. Example 6 shows a catalyst prepared according to the present invention wherein the large organic template component is broken up and removed by calcination.

EXAMPLE 1

A zeolite beta catalyst having a silica to alumina ratio of nominally about 40 was prepared from a forming mixture containing silica, aluminum sulfate, sodium hydroxide, and tetraethylammonium bromide as an organic template. The crystallized zeolite was washed with water and ammonium nitrate solution in order to reduce the sodium to a low level, i.e., less than 0.05 weight percent. The resulting catalyst was dried to 121° C. (250° F.).

EXAMPLE 2

To 111 grams of dried zeolite beta from Example 1 containing 100 grams of solids was added over 50 minutes in a muller mixer 157 milliliters of a tetrammine platinum (II) nitrate solution containing 1.1 grams of platinum. 132 grams of Kaiser SA alumina powder (100 grams of solids) was thereafter added to the muller mix. After a slight water adjustment, the mix was extruded to 1/16 inch diameter cylinders, dried, heated at 2.8° C. per minute (5° F. per minute) in nitrogen flow to 538° C. (1000° F.), held in a flow of nitrogen for 3 hours at 538° C. (1000° F.) and then in air for 3 hours. Platinum dispersion as measured by hydrogen chemisorption was 0.13.

EXAMPLE 3

A portion of the dried extrudate from Example 2 was calcined by heating in gradual steps in an atmosphere of 0.7 volume percent oxygen/99.3 volume percent nitrogen in order to show the effect of a gentle burn-off schedule. The temperature was held for 2 hours at each of the following temperatures: 316° C. (600° F.), 371° C. (700° F.), 399° C. (750° F.), 427° C. (800° F.) 454° C. (850° F.) with a final treatment in air at 538° C. (1000° F.). Platinum dispersion was measured as 0.13.

EXAMPLE 4

Platinum-containing zeolite beta was prepared using chloroplatinic acid as the platinum source. 122 grams of dried zeolite from Example 1 (100 grams of solids) were added to 142 grams of Kaiser SA alumina powder (100 grams of solids) in a muller mixer. To this were added 132 ml of chloroplatinic acid solution containing 1.2 grams of platinum and sufficient water to adjust for extrusion. The resulting mixture was extruded to 1/16 inch diameter extrudates, dried at 121° C. (250° F.), and calcined as in Example 2. Platinum dispersion was measured as 0.38 while the average platinum crystallite size was calculated as 41 Angstroms from x-ray diffraction line broadening measurements.

EXAMPLE 5

An attempt was made to improve platinum dispersion and platinum crystallite size in a zeolite beta by using a higher purity alumina source, Catapal SB available from Conoco Chemical Co. The properties of this alumina source and the Kaiser SA aluminas employed in the other examples are shown in Table 1.

One hundred milliliters of chloroplatinic acid solution containing 1.2 grams platinum was added to 141 grams of Catapal SB alumina (100 grams solids) in a muller mixer. One hundred grams of dried zeolite and sufficient water for extrusion were then added to the mixture. The 1/16 inch extrudate was dried and then calcined in a mixture of 2 volume percent oxygen and 98 volume percent nitrogen at a heat-up rate of about 0.5° C. per minute (1° F. per minute) to 510° C. (950° F.) and held thereat for 2 hours followed by air treatment for 2 hours at the same temperature.

The resulting catalyst material exhibited a platinum dispersion of 0.30 and a platinum crystallite size of 60 Angstroms. No significant improvement was obtained by utilizing a different alumina source.

EXAMPLE 6

The zeolite of Example 1 was compressed into ½ inch diameter wafers, and thereafter calcined by heating and flowing nitrogen for 3 hours at 538° C. (1000° F.) and for 3 more hours at 538° C. (1000° F.) in air. One hundred grams of calcined wafers and 141 grams of Catapal SB alumina (100 grams solids) were mixed in a muller mixer for 30 minutes to form a mixed powder. To this were added 150 ml chloroplatinic acid containing 1.2 grams of platinum. The mix was extruded to 1/16 inch diameter cylinders, dried at 121° C. (250° F.), and calcined in a flow of air for 2 hours at 510° C. (950° F.). Platinum dispersion was measured as 0.67 while platinum crystallite size was only 28 Angstroms. This compares favorably with Examples 4 and 5 which were prepared in the same manner except for zeolite calcination prior to noble metal incorporation.

EXAMPLE 7

A sodium silicate solution was prepared by mixing 36.62 parts of sodium silicate (28.7 wt. % SiO$_2$, 8.9 wt. % Na$_2$O, 21.17 parts water and 0.11 parts Daxad 27 (W. R. Grace & Company).

An acid solution was prepared by adding together 3.83 parts H$_2$SO$_4$, 4.33 parts NaCl and 21.73 parts water.

The sodium silicate solution and acid solution were mixed in a stirred autoclave containing 1.05 parts water. Added to this mixed solution was 2.52 parts NaCl to form a gel.

An organic solution was prepared by adding together 2.46 parts tri-n-propylamine, 2.12 parts n-propylbromide and 4.07 parts methylethylketone.

The organic solution was added to the gel and the resultant mixture was heated to 210° F. (99° C.). After crystallization was greater than about 50% complete, the temperature was increased to 320° F. (160° C.) for 8 hours. Unreacted organics were removed by flashing and the remaining contents were cooled. The remaining zeolite was dialyzed, dried and identified as ZSM-5 having a silica to alumina mole ratio of about 520.

The resulting material is then contacted with an aqueous 10 wt. % solution of sodium hypochlorite having a pH of about 12 in order to effect removal of organic template material within the ZSM-5 zeolite.

A mixture of 49.82 parts of the above formed ZSM-5 zeolite and 49.82 parts dried alumina is treated in a muller with a solution containing 0.36 parts tetrammine palladium (II) chloride and with sufficient water to extrude the mass into 1/16 inch (0.16 cm) pellets. The extruded material contains 50 parts ZSM-5, 50 parts alumina and about 0.2 wt. % palladium. The resulting product has a palladium crystal size of less than about 20 A and a metal dispersion $D_m$ greater than about 0.5.

TABLE 1

| ALUMINA COMPOSITION, WT % | | |
|---|---|---|
| | Catapal SB | Kaiser SA |
| $Al_2O_3$ | 74.2 | 70 |
| Carbon | 0.36 | — |
| Silica ($SiO_2$) | 0.008 | 0.10 |
| Sodium ($Na_2O$) | 0.004 | 0.03 |
| Iron ($Fe_2O_3$) | 0.005 | 0.06 |
| Sulfur | 0.1 | 0.02 |
| Titania ($TiO_2$) | 0.12 | — |
| LOI | 25.8 | 30 |
| Chloride | — | .15 |

It is claimed:

1. A process for preparing a noble metal-containing zeolite catalyst which comprises crystallizing a zeolite from a forming mixture which contains an organic template, treating the as-crystallized zeolite to remove greater than about 75% by weight of said template from the zeolite, blending said zeolite with an inorganic oxide binder and a noble metal-containing solution, and extruding the blended mixture.

2. The process of claim 1 wherein said treating comprises chemical oxidation of said organic template.

3. The process of claim 2 wherein said treating comprises contacting said zeolite with sodium hypochlorite.

4. The process of claim 1 wherein said treating comprises calcining said zeolite at temperatures ranging from about 460° to 816° C.

5. The process of claim 4 wherein said temperatures range from about 482° to 649° C.

6. The process of claim 4 wherein said calcining occurs in the presence of steam.

7. The process of claim 4 wherein said calcining occurs in the presence of oxygen.

8. The process of claim 4 wherein said calcining occurs in the presence of an inert gas.

9. The process of claim 1 wherein the as-crystallized zeolite contains alkali metal which is removed prior to said treating to remove the template.

10. The process of claim 1 wherein said organic template is selected from the group of pyrrolidine, choline chloride, n-propylamine and quaternary ammonium ions.

11. The process of claim 1 wherein said zeolites have a silica to alumina mole ratio of at least 4 and a constraint index ranging from about 0.1 to 12.

12. The process of claim 11 wherein said zeolites are selected from the group consisting of zeolite beta, ZSM-5, ZSM-11, ZSM-12, ZSM-18, ZSM-20, ZSM-22, ZSM-23, ZSM-35, ZSM-38, and ZSM-48.

13. The process of claim 12 wherein the zeolite is zeolite beta.

14. The process of claim 1 wherein said zeolites are selected from the group consisting of ZSM-18 and ZSM-20.

15. The process of claim 1 wherein the noble metal is selected from the group consisting of platinum, palladium, rhodium, ruthenium, silver, rhenium, and iridium.

16. The process of claim 15 wherein said noble metal is platinum.

17. The process of claim 1 wherein said binder is selected from the group consisting of silica-alumina, silica, and alumina.

18. The process of claim 17 wherein said binder is alumina.

19. The process of claim 1 wherein said blended mixture comprises about 5 to 90 weight percent binder.

20. The process of claim 19 wherein said blended mixture comprises about 10 to 50 weight percent binder.

21. The process of claim 1 wherein the silica to alumina mole ratio of the zeolite is at least 20 to 1.

22. The process of claim 1 wherein said catalyst contains about 0.01 to 2.0 weight percent noble metal.

23. The process of claim 22 wherein said catalyst contains about 0.05 to 1.2 weight percent noble metal.

24. The process of claim 1 wherein said solution comprises noble metal in a cationic form.

25. The process of claim 24 wherein said cationic noble metal species is selected from the compound group consisting of tetrammine platinum (II) nitrate, tetrammine platinum (II) chloride, platinum tetrafluoride, palladium chloride, palladium selenate, dichlorodiammine palladium (II) chloride, tetrammine palladium (II) chloride, and diammine palladium (II) hydroxide.

26. The process of claim 1 wherein said solution contains noble metal in an anionic form.

27. The process of claim 26 wherein said noble metal in an anionic form is selected from the group consisting of hydroxyplatinic acid, bromoplatinic acid, chloropalladic acid and chloroplatinic acid.

28. The process of claim 27 wherein said solution contains chloroplatinic acid.

29. The process of claim 1 wherein said noble metal-containing zeolite catalyst contains noble metal crystallites of less than about 30 A.

30. The process of claim 1 wherein the noble metal-containing zeolite catalyst has a noble metal dispersion of at least about 0.25.

31. The process of claim 30 wherein said dispersion is at least about 0.50.

32. A noble metal-containing zeolite catalyst produced by the method of claim 1.

33. A noble metal-containing zeolite catalyst comprising a crystalline zeolite, an inorganic oxide binder and a noble metal, wherein said catalyst has a noble metal dispersion greater than about 0.50 and noble metal crystallites of less than about 30A.

34. A process for preparing a noble metal-containing zeolite catalyst, which process comprises crystallizing zeolite beta from a forming mixture which contains an organic template, treating said zeolite to remove said template from the zeolite, blending said zeolite with an alumina binder and thereafter adding a solution containing an anionic species of a noble metal and extruding the resulting mixture.

35. The process of claim 34 wherein said noble metal is platinum.

36. The process of claim 34 wherein said anionic species is selected from the group consisting of chloropalladic acid, hydroxyplatinic acid, bromoplatinic acid and chloroplatinic acid.

37. The process of claim 34 wherein said anionic species is chloroplatinic acid.

38. The process of claim 34 wherein said catalyst contains 10 to 90 weight percent alumina.

39. The process of claim 34 wherein said organic template is removed by thermal decomposition.

40. The process of claim 34 wherein said organic template is removed by combustion.

41. The process of claim 34 wherein said organic template is removed by chemical oxidation.

42. The process of claim 34 wherein said catalyst has a noble metal dispersion of at least about 0.50 and noble metal crystallites of less than about 20A.

* * * * *